United States Patent [19]

Carangelo

[11] Patent Number: 4,852,330
[45] Date of Patent: Aug. 1, 1989

[54] METHOD FOR STABILIZING STACKED LOAD

[76] Inventor: Martin C. Carangelo, 52 Orchard La., Wolcott, Conn. 06716

[21] Appl. No.: 77,044

[22] Filed: Jul. 24, 1987

Related U.S. Application Data

[63] Continuation-in-part of Ser. No. 861,363, May 9, 1986.

[51] Int. Cl.[4] ................................. B65D 13/02
[52] U.S. Cl. .................................. 53/399; 53/441; 53/447; 206/83.5; 206/386; 206/597
[58] Field of Search .................. 206/83.5, 386, 597, 206/497; 150/52 R; 296/100, 101; 229/87 R; 53/399, 398, 441, 447; 108/55.1, 55.5

[56] References Cited

U.S. PATENT DOCUMENTS

| | | | |
|---|---|---|---|
| Re. 31,191 | 3/1983 | Connolly | 206/597 |
| 1,871,101 | 8/1932 | Waltz | 150/52 R |
| 2,696,360 | 12/1954 | Toffolon | 206/597 |
| 2,705,557 | 4/1955 | Hartman | 150/52 R |
| 2,766,797 | 10/1956 | Cowen | 150/52 R |
| 3,371,815 | 3/1968 | Macomber | 206/597 |
| 3,393,835 | 7/1968 | Kantor et al. | 296/100 |
| 3,397,009 | 8/1968 | Landenberger | 296/100 |
| 3,453,620 | 7/1969 | Santillo, Jr. | 296/100 |
| 3,614,154 | 10/1971 | Evans | 296/100 |
| 3,615,117 | 10/1971 | Neidlinger | 296/100 |
| 3,945,493 | 3/1976 | Cardinal | 206/497 |
| 4,036,364 | 7/1977 | Ambrose | 206/526 |
| 4,085,846 | 4/1978 | Williams | 206/600 |
| 4,206,846 | 6/1980 | Connolly | 206/597 |
| 4,221,085 | 9/1980 | Conaghan | 150/52 R |
| 4,248,343 | 2/1981 | Schaefer | 150/52 R |
| 4,270,657 | 6/1981 | Bayon | 206/386 |
| 4,445,614 | 5/1984 | Mitsumori et al. | 206/600 |
| 4,454,705 | 6/1984 | Benno | 206/497 |
| 4,569,439 | 2/1986 | Freye et al. | 206/83.5 |

FOREIGN PATENT DOCUMENTS

| | | | |
|---|---|---|---|
| 3106623 | 9/1982 | Fed. Rep. of Germany | 206/597 |
| 2291110 | 6/1976 | France | 206/597 |
| 719927 | 3/1980 | U.S.S.R. | 206/597 |

Primary Examiner—David T. Fidei
Attorney, Agent, or Firm—F. R. Hirtler

[57] ABSTRACT

This invention deals with a method for stabilizing stacked loads against shifting during transport and means for carrying out such method comprising a flexible wrapping member and rubber like fastening means for said wrapping member.

1 Claim, 1 Drawing Sheet

METHOD FOR STABILIZING STACKED LOAD

This application is a continuation-in-part of application Ser. No. 861,363, filed May 9, 1986.

BACKGROUND OF THE INVENTION

This invention deals with a method for stabilizing stacked loads against shifting as well as means for carrying out such stabilizing.

When carrying goods such as merchandise contained in cartons, crates, packages, bags and the like, they are commonly transported directly on trucks, railroad cars, carts or planes or on pallets or other portable platforms that may be readily handled by transfer equipment such as forklift trucks and transported by the above conveyances.

Invariably, such moving and transporting jostles or shakes stacked loads and may cause them to collapse not only resulting in such merchandise to suffer damage but also presenting a danger to persons handling such unstabilized stacked goods.

Various means have been suggested for overcoming the problem of shifting goods as typically represented by these references of interest:

U.S. Pat. No. 2,696,360 (Toffolon) teaches a binder and string assembly comprising four corner pieces made from heavy sheet material such as fabric or sheet plastic, said corner pieces being interconnected by adjustable length straps along the sides and over the top of the load; in addition, the bottom edge of the corner pieces ought to be attached to the pallet. The fastening system of this reference is cumbersome, expensive, time consuming and probably does not fully serve the purpose for which it was intended for lack of flexibility.

U.S. Pat. No. 3,371,815 (Macomber) deals with a freight binding device consisting of a rigid base to which is hingedly attached on one side upright wrapping means bendable along a plurality of vertical hinges and possibly held together by flexible cords. This reference is primarily concerned with holding together oversized or odd sized loads in a boxed like fashion.

U.S. Pat. No. 4,036,364 (Ambrose) describes a palletless load unit wherein the lowest members of a stacked load are compressively and rigidly bound together by a strap, the upper portions of the stacked load being secured by a heat-shrinkable bag. As much as this invention may have merit with stacked loads of rather uniform dimensions, it does not seem to provide the transporter of goods to readily secure such goods in a quick and inexpensive way especially since the shrinkable bag is not recoverable.

U.S. Pat. No. Re. 31,191 (Connolly) discloses the use of plastic netting using stretch-wrapping technique, i.e. special costly wrapping equipment is required in order to essentially cover the full sides of the palletized load with a net which is nonrecoverable; such equipment and system is unsuitable for the day-to-day operation of, for instance, a distributor who has to be able to receive and re-palletize loads of various sizes quickly and easily.

U.S. Pat. No. 4,270,657 (Bayon) is concerned with an improved storing net for palletized loads using straps having bridging openings. This method may be suitable for unitized loads, but it is considered impractable for loads having various shapes and heights.

U.S. Pat. No. 4,402,409 (Slocumb) teaches also a plastic netting for tension wrapping palletized loads, wherein the strands are made from linear low density polyethylene. However, the latter material is not a rubber or elastomer and is deficient in comparison to this invention.

SUMMARY OF THE INVENTION

It has now been found that stacked loads such as represented by stacked crates, cartons, bags, etc., whether on the floor of or on a pallet in a warehouse, truck, railroad car, ship, cart or airplane may be readily secured against unstabilizing forces such as bumping, jostling, shaking and the like in accordance with the instant invention by reusable elastomeric i.e. rubber like and flexible wrapping means, such as sheet or net capable to at least partially enveloping such stacked load and having means for fastening the ends of said wrapping means.

It is therefore the object of this invention to provide a method for securing stacked loads.

It is another object to provide method for reducing the hazards of stacked loads to handling personnel.

It is a further object of this invention to provide means for carrying out such load securing method.

Other objects shall be apparent by the following description and claims.

DESCRIPTION OF THE SPECIFIC EMBODIMENTS

Figure 1:
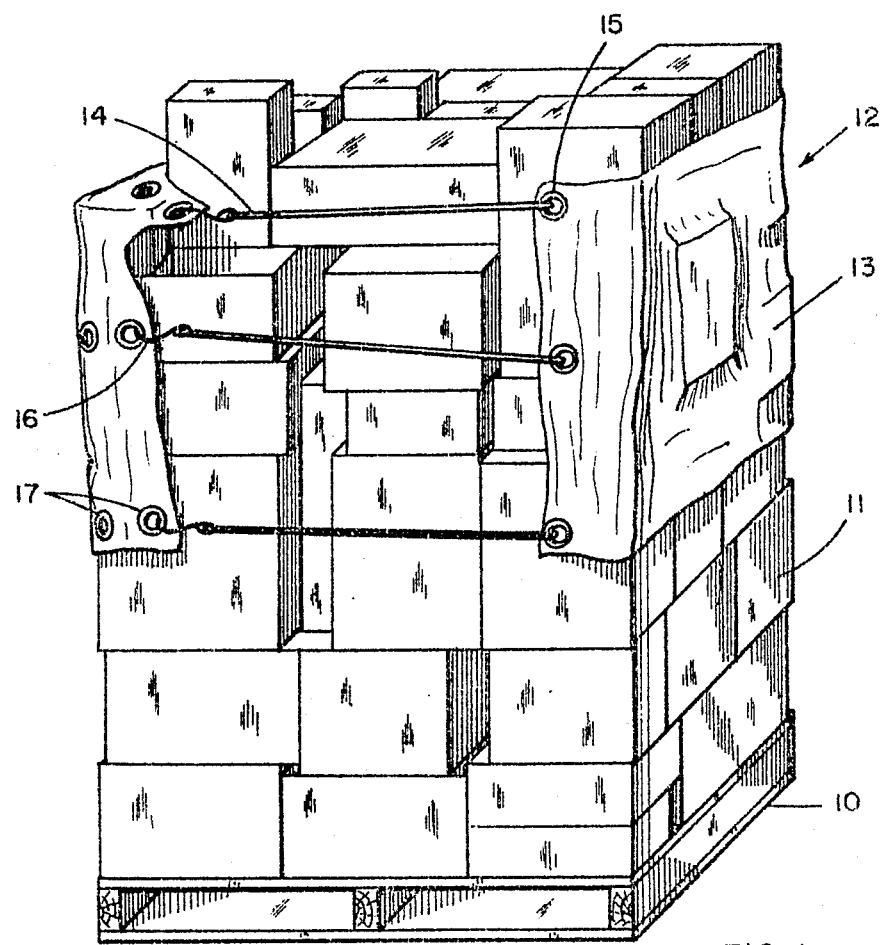
FIG. 1 is a perspective view of a stacked load whose upper layers of stacked items is secured by means of this invention.

As illustrated in FIG. 1, a plurality of items of boxed or bagged goods 11 may be stacked on, for instance, a pallet 10 as is customary for transporting such goods, e.g. from place manufactured or origin to a warehouse or distributor and ultimately to a place of use or retailer. It is essential that throughout handling and transporting such stack of goods be prevented from shifting and possibly collapsing. Such securing of goods can be achieved quickly, easily and most effectively by wrapping means 12 of this invention, the latter comprising a wrapping member 13 and rubber like fastening means used to tie the ends of said wrapping member sufficiently to maintain the whole assembly in a state of tension.

Said fastening means comprise rubber like straps 14 tied into wrapping member by means of grommet 15, whereas the loose end has attached thereto hook 16, hooked into grommet 17 of wrapping member.

It is essential that at least the top most layer of stacked items be completely surrounded by the wrapping means of this invention, although the wrapping means may be placed around more than one top layer, keeping, however, in mind that the top most layer must be included in such fastening. The wrapping means of this invention may of course reach from the top layer of the stacked goods as far down as the pallet or to the floor of a vehicle, but it has been found that such essentially complete coverage does not greatly enhance the effectiveness of this method of securing a stacked load. A wrapping member width of about 4–18 inch would likely accommodate the top layer of a stack, however, it is more preferred to secure the one to three uppermost layers which may need a wrapping sheet width of about 4–48 inch, yet, the wrapping member may have a width of 4–120 inch or more. The length of the wrapping member may be 9–15 foot, preferably 13–15 foot, it being understood that this length be applicable to accommodate loads such as stacked on Grocery Manufacturers Association (GMA) standard 40×48 inch pallets. Other length may be desirable depending on pallet size or load dimension. Fastening means may be attached to one end of the sheet 2–24 inch apart, usually 6–18 inch apart, and may be located a suitable distance from the edge of the wrapping member usually ½–2 inch. As indicated, the fastening means, usually flexible cords, springs whether metallic or made by other materials, or straps, may be employed to tie together, under tension, the two narrow ends of the wrapping member in any suitable and known fashion such as by tying knot, using holes-and-buckle device, two-ring, hook and ring type and the like, such fastening means being passed through eyes or other openings in the wrapping member at points mentioned above. Alternatively and preferably one end of the fastening means is permanently attached to one narrow side of the wrapping member, the other end being free and preferably carrying a fastener such as a hook with corresponding eyes or grommets being disposed along the length of the other narrow end of the wrapping member.

Figure 2:
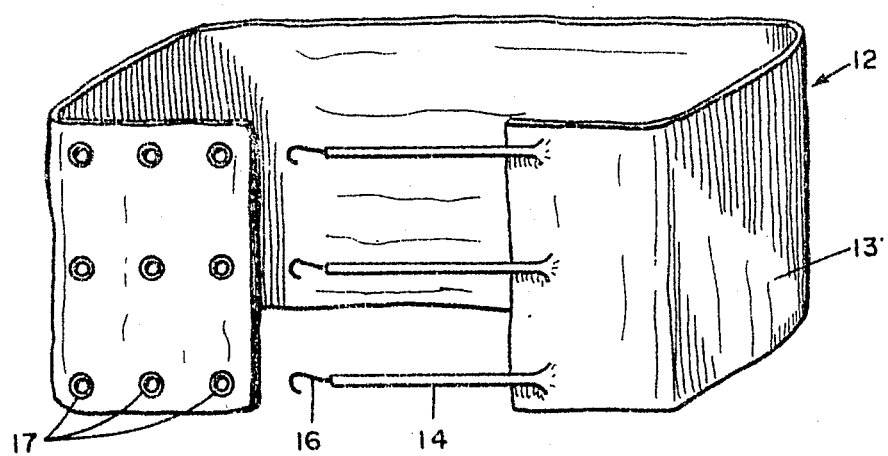
FIG. 2 is a perspective view of a wrapping means of this invention.

In FIG. 2 the construction of a wrapping means 12 of this invention wherein elastomeric straps 14 with hooks 16 are permanently attached to narrow end of wrapping member 13, whereas the other narrow end of wrapping member 13 carries grommets 17 complementary to the above mentioned straps; it being noticed that a plurality of grommets in a row are provided so as to accommodate different sizes of stacked goods or to vary strap tension.

The wrapping member has to be flexible and possibly at least partially stretchable to accommodate the corners and/or irregularities of the stacked items and may be a cloth, flexible plastic sheet, net or combination thereof, possibly made from stretchable or non-stretchable fabric based on natural or synthetic materials such as cotton, hemp, sisal, polyamide, polyester, polyethylene, polypropylene, aramide, polyurethane, poly(vinyl chloride), polyacrylonitrile, polymethacrylonitrile and the like or from natural, synthetic rubbers or thermoplastic elastomer such as outlined below.

The elastomeric fastening means or at least a portion of the wrapping member are manufactured from elastomers including natural rubber, synthetic rubber such as polyisoprene, polybutadiene, poly(butadiene-styrene), poly(butadieneacrylonitrile), poly(ethylene-propylene nonconjugated diene), polyurethane, chlorinated or chlorosulfonated polyethylenes, polychloroprene, thermoplastic elastomers such as oil-extended and non-oil-extended, partially or fully cured blends of elastomers with plastic polymers such ethylene-propylene elastomers with polyethylene or polypropylene, block copolymers of styrene with isoprene or butadiene and the like. Polyurethane is preferred for its high abrasion resistance.

Attachment of fastening means to the wrapping member may be accomplished in any suitable way such as by tying, sewing, stapling or riveting.

In another aspect of this invention the wrapping member may have, at least in part, rubber like characteristics, and may be equipped with fastening means directly attached to either narrow side, such as a suitable number of hooks being sewn onto one narrow end, whereas corresponding openings such as grommets being disposed on the other end. One may consider the fastening means being an integral part of the wrapping member. In a further modification, fastening means, such as hooks, buckles, etc., may be attached to straps or cords and the like, which may or may not be rubber like. In any case, care should be taken that at least 5–50%, preferably 5–35%, most preferably 7.5–25% of the total length of the wrapping means has rubber like properties as defined under American Society for Testing and Materials (ASTM, 1970 Edition, part 28, p. 686) designation D 1566, which states that a rubber is a material that is capable of recovering from large deformations quickly and forcibly, and can be, or already is, modified to a state in which it is essentially insoluble (but can swell) in boiling solvent, such as benzene, methyl ethy[1] ketone, and ethanol-toluene azeotrope. A rubber in its modified state, free of diluents, retracts within one minute to less than 1.5 times its original length after being stretched at room temperatures (18 to 29 C.) to twice its length and held for one minute before release. The wrapping member is three dimensionally flexible and made from materials such as canvas, sailcloth and coated fabrics in order to accommodate the corners and irregularities of the stacked items.

For the purpose of this invention, rubber like materials retracting to 1.3 times its original length are preferred, most preferred being those materials recovering essentially to its original length even after having been stretched for extended and repeated durations.

The rubber like portions of the wrapping means may be elongated over 200%, preferably up to 150%, most preferably up to 120% of its original length. It has been found that in use, 80–120% elongations are commonly exerted.

EXAMPLE

On a 40 inch×48 inch GMA standard wooden pallet is stacked six different layers of various boxed merchandise to a height of 7½ foot high in an approximately square fastion. A wrapping means consisting of a 14×2¼ foot canvas wrapping member having attached thereto on one narrow end three rubber like elastomeric straps each six inches long at 12 inch intervals, said straps being each equipped with a hook and the other narrow end having three rows of four metal grommets located coincidentally with the straps, is placed around the two uppermost layers and is tightly secured by pulling the straps with a force of about 135 psi and placing each hook in the respective available grommet. The wrapping means of this invention is readily collapsible upon itself and is not attached to any platform designed to carry a stacked load.

In similar fashion, an items of commerce known as Uni-Wrap [trademark], having about the same dimensions as the wrapping means of this invention but being constructed without elastomeric wrapping member and/or fastening means is applied to another pallet stacked with essentially the identical items and dimensions.

Both thus secured pallets are loaded onto the back of a 4-wheeled truck and driven over town roads in a variety of stop and go, etc. traffic conditions. After about four hours of driving it is unexpectedly noted that the pallet load treated in accordance with this invention is substantially in the same condition as before the test drive whereas the top layers of the comparison pallet load have shifted considerably indicating that the stacked load may collapse upon longer exposure to such driving conditions, possibly resulting in damage to the product.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A method for securing a stacked load comprising stacking a plurality of layers of items, providing a reusable wrapping means consisting essentially of a flexible, rectangular wrapping member, said wrapping member having fastening members attached to a short side of said member and securing means attached opposite said side thereof; 5 to 50 percent of the total length of the wrapping means being elastomeric, said wrapping means being collapsible upon itself and being devoid of any fastening means capable of reaching over the top of a stacked load, placing said wrapping means around one or more of the uppermost layers of the stacked load leaving said wrapping means separate from any base and leaving at least the lowest layer uncovered, and, connecting said fastening members to said securing means under tension.

* * * * *